United States Patent
Perkins

[11] 3,813,985
[45] June 4, 1974

[54] FASTENERS AND METHOD OF MANUFACTURE THEREOF

[75] Inventor: Garry R. Perkins, Carry, Ill.

[73] Assignee: Spotnails, Inc., Rolling Meadows, Ill.

[22] Filed: Dec. 1, 1971

[21] Appl. No.: 203,610

Related U.S. Application Data

[63] Continuation-in-part of Ser. No. 846,198, July 30, 1969, abandoned.

[52] U.S. Cl. .......... 85/49, 85/10 F, 85/1 C, 85/44, 156/332, 260/17
[51] Int. Cl. .......... F16b 15/00
[58] Field of Search .......... 85/10 F, 1 C, 10 R, 49; 117/128.4, 132 C

[56] References Cited
UNITED STATES PATENTS
327,339  9/1885  Squire .......... 85/49

2,423,171  7/1947  Burton .......... 85/10 F

FOREIGN PATENTS OR APPLICATIONS
1,159,445  2/1958  France .......... 85/49

*Primary Examiner*—Edward C. Allen

[57] ABSTRACT

Improved fasteners providing superior bonding and holding power in wood or other materials. A variety of coated fasteners including single-bevel divergent point staples and an adhesive and coating composition to secure staples and other fasteners together in contiguous relation and to provide increased bonding holding power in the material into which the fastener is driven are disclosed.

12 Claims, 12 Drawing Figures

PATENTED JUN 4 1974 3,813,985

INVENTOR
Garry R. Perkins
BY Alexander & Speckman
ATTYS.

3,813,985

FASTENERS AND METHOD OF MANUFACTURE THEREOF

CROSS REFERENCE TO RELATED APPLICATIONS

This application is a continuation-in-part of my earlier application, Ser. No. 846,198, filed July 30, 1969 now abandoned.

BACKGROUND OF THE INVENTION

1. Field of the Invention

This invention relates to coated fasteners, novel polymeric coating compositions and novel single-bevel divergent point staple fasteners in coated and uncoated form.

2. Description of the Prior Art

Machine driven fasteners are gaining ever-widening uses in industry. It is becoming increasingly important to provide fasteners secured together in contiguous fashion, especially in the form of sticks, rolls, or unified groups of fasteners, for handling in connection with rapid driving machines.

One type of fastener especially in demand is the heavier staple of longer length than used in the past. Prior staple designs and methods and adhesive coatings of staples and other fasteners together to form contiguous "sticks" have not been entirely satisfactory, especially with heavier staples. The cohering of larger and heavier fasteners, such as staples, in "sticks" requires more efficient adhesives to avoid the poor bonding which results in a high frequency of broken sticks.

One further problem which arises is the tendency of staples of conventional design, particularly long staples, to follow the wood grain, sometimes resulting in an end of the staple protruding from the wood surface. This reduces the holding power of the staple, often renders the product unusable, and may even cause injury to persons handling such products.

The desirability of heavier staples has also created difficulties in the production of staples having uniform points. Such problems are particularly prevalent in divergent-point staples, the points of which, prior to this invention, were made by double cutting. The points of previously produced divergent-point staples had at least two faces for causing the staple leg when driven to move out of a plane formed by the axis of the legs of the staple as well as out of a plane normal to the aforementioned plane and containing the axis of the undriven leg. The prior divergent-point staples, having at least two angular bevels, have the disadvantage that the points are too fine when heavy staples are employed, causing the end of the point to turn back on itself resulting in a dull leading edge of the staple. As cutters used in production of such prior staples wear, the relationship between the two bevels may change, causing the staple to proceed in an undesired direction when driven. Furthermore, the final part of the second cut frequently results in a staple which appears to have three bevels rather than two.

Still another problem resulting from the use of heavier and larger fasteners, such as staples, is the tendency for the plastic or adhesive with which they may be coated to chip from the surface either while being handled or while being driven into the materials to be fastened. Chipping of both the surface of the fastener struck by a driving tool and surfaces of the fastener entering wood or other materials has been experienced with prior art coatings and results ultimately in corrosion of the fastener when in place.

My invention provides improved coated fasteners, particularly staple fasteners having single-bevel divergent points for superior holding power, and groups of fasteners held together in stick form by the adhesive coating composition of this invention. My invention also includes a novel adhesive and coating composition which may be applied cold to the finished fasteners, to secure the fasteners together in contiguous relation for use in various fastener-driving machines. The adhesive composition of my invention also provides a corrosion-resistant fastener and a fastener which provides increased holding power in the material, such as wood, into which it is driven.

It is an object of my invention to provide improved fasteners to overcome the above-mentioned disadvantages.

It is another object of my invention to provide an adhesive composition to secure fasteners together in contiguous relation to to also provide increased bonding and holding power of the fastener to the material into which the fastener is driven.

It is still another object of my invention to provide improved staples having superior bonding and holding power in wood or other materials and having single-bevel divergent points.

These and other important objects will become apparent from the following description and from the drawings showing various preferred embodiments wherein the coating compositions of this invention are employed.

SUMMARY OF THE INVENTION

This invention relates to coated fasteners, especially those in thick form which may be adhesively united together with the adhesive-coating compositions of this invention; to novel polymeric adhesive-coatings for use in adhesively uniting and/or coating individual fasteners; and to a novel single-bevel, divergent point staples in coated or uncoated form and to single coated staples and to groups of staples united together in stick form by said adhesive coating.

The novel staple comprises a body having a crown, first and second legs in generally parallel U-formed relation to said crown, each of said legs terminating in a single bevel extending substantially across the full section of the respective leg and forming a point area at the bevel edge furthest from the crown, each of said bevels forming an angle of from about 20° to about 70° with a plane normal to the axis of said leg and each of said bevels being normal to a plane which contains the axis of the respective leg and is from about 20° to about 70° with a plane containing the axes of both of said legs.

Previous problems of broken sticks of fasteners and poor bonding have been overcome by the adhesive of my invention which is especially valuable for the heavier staples of this invention. The adhesive of my invention may be applied cold to the finished fastener which is maintained in serial contiguous relation with other like fasteners. Fasteners may be formed into sticks by spreading the adhesive over the surfaces of the completely formed fasteners by wiping, brushing, spraying or by passing the fasteners through an adhesive-filled reservoir. The adhesive will readily dry in air at ambient temperatures, but other drying methods such as heat may be utilized to hasten the drying process if desired. The thickness of the coating may vary over wide ranges, depending on the organic solvent, and the amount of solids. A preferable range is from about 0.0005 inch to about 0.0025 inch.

The adhesive composition comprises from about 55 to 75 weight percent nitro-cellulose, from about 20 to 40 weight percent of a thermo-plastic acrylic polymer, from about 3 to 5 weight percent of a low-temperature plasticizer, and, if desired, up to 5 weight percent of nylon or stated alternatively from 0 to 5 percent nylon. The acrylic polymers are preferably selected from lower acrylic and methacrylic esters preferably formed from alcohols containing up to about four carbon atoms, e.g. methyl, ethyl, propyl, butyl. Methyl methacrylate has been found to be one of the preferred acrylic polymers. The low-temperature plasticizer may be selected from the phosphoric acid esters including cresyl diphenyl phosphate, tricresyl phosphate; the phthalic anhydride esters including butyl octyl phthalate, dibytyl phthalate, dicyclohexyl phthalate, diethyl phthalate, dihexyl phthalate, diisodecyl phthalate, di(2-methoxyethyl) phthalate, dimethyl phthalate, dioctyl phthalates, ditridecyl phthalate, and octyl decyl phthalates; the trimellitic acid esters; the adipic acid esters; the azelaic acid esters; the epoxidized esters; glycerol monoricinoleate; isopropyl myristate; isopropyl palmitate; the oleic acid esters; the sebacic acid esters; stearic acid esters; and complex linear polyesters and polymeric plasticizers. Triphenyl phosphate has been found to be one of the preferred low-temperature plasticizers.

The adhesive agent of my invention preferably comprises from about 20 to 40 weight percent solids in an organic solvent. Any organic solvent which provides for solution of the nitro-cellulose plasticizer and acrylic polymer, including mixtures of solvents, is suitable.

A preferred adhesive composition will be 20 to 40 weight percent solids wherein the solids portion comprises from about 20 to 40 weight percent methyl methacrylate, 55 to 75 weight percent nitro-cellulose, and from about 3 to 5 weight percent triphenyl phosphate. It has been found that this composition not only provides superior cohesion of the fasteners, but also provides surprisingly superior bonding between the coated fastener and material into which the fastener is driven, especially wood. This coating has been found to form an excellent bond with steel fasteners and does not chip, even by blows with pneumatic driving machines. Thus, the fastener is permanently protected against corrosion. The adhesive may be color-matched for use in fastening flooring, carpeting, shingles and other materials in which a portion of the fastener may be exposed.

BRIEF DESCRIPTION OF THE DRAWINGS

Referring to the attached drawings.

DESCRIPTION OF THE PREFERRED EMBODIMENTS

Figure 1:
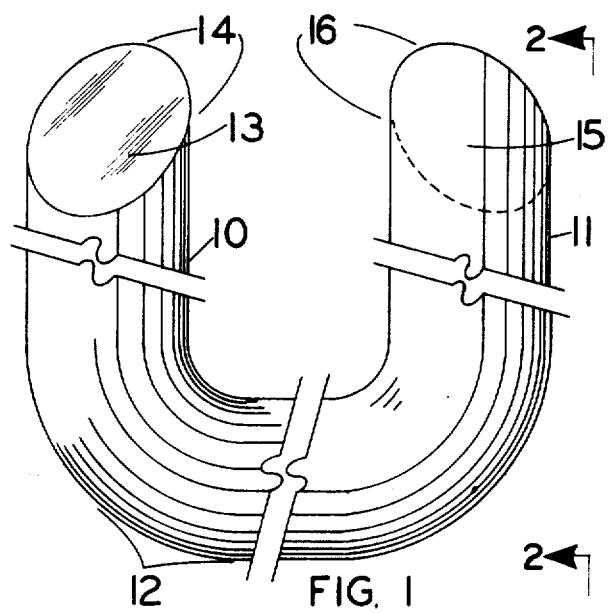
FIG. 1 is a side view of a single-bevel divergent-point staple at 90° to the plane of the staple legs.
Figure 2:
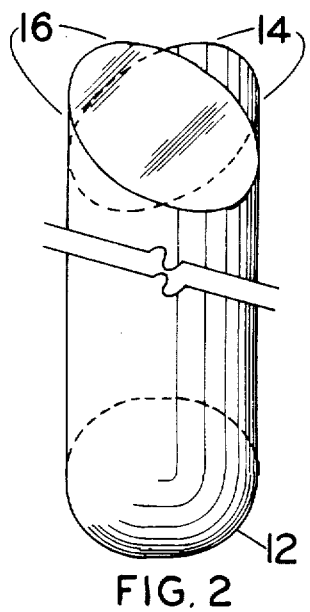
FIG. 2 is a right-end magnified view of the leg ends of the staple of FIG. 1.

Referring to the drawings and more specifically to FIG. 1, a staple of this invention is shown having first leg 10, second leg 11, and crown 12. Leg 10 terminates in single bevel 13 extending substantially across the full section of leg 10. The edge formed by bevel 13 with leg 10 furthest from crown 12 forms a point area referred to as 14. The angle of bevel 13 with a plane normal to the axis of leg 10 may be varied from about 20° to about 70° depending upon the thickness of leg 10, the speed at which insertion of the staple is desired, the material into which the staple is inserted, the clinching qualities desired, the spread qualities desired and the like.

Bevel 13 is formed such that the plane containing the axis of leg 10 and normal to bevel 13 forms an angle of about 20° to about 70° with the plane containing the axes of both legs 10 and 11. Bevel 13 may be such that the plane containing the axis of leg 10 and normal to bevel 13 falls in any of the solid quadrants formed by the plane containing the axes of both legs 10 and 11 and the plane normal thereto containing the axis of leg 10. A preferred range of angles is from about 40° to about 50°.

Leg 11 likewise terminates in single bevel 15 extending substantially across the full section of leg 11, within the angular limits set forth for bevel 13 and forming a point area referred to as 16.

Figure 3:
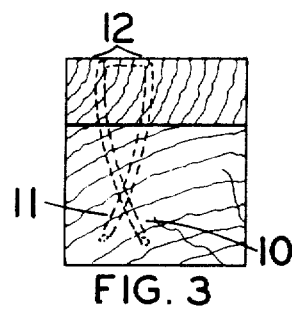
FIG. 3 is a cross-section parallel to the plane of the staple showing a staple as shown in FIG. 1 driven into two pieces of wood.
Figure 4:
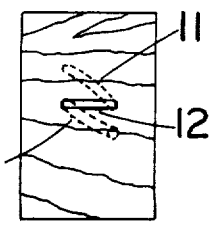
FIG. 4 is a top view of the section shown in FIG. 3.

Bevels 13 and 15 may be in any relationship to each other within the range of angles referred to above. In a preferred embodiment of my invention it is desired that the legs of the driven staple cross over and spread laterally from the plane through the axes of both legs of the undriven staple. Referring specifically to FIG. 3, a side view of a staple of the type shown in FIG. 1, the cross-over paths followed by the legs of the staple due to bevels 13 and 15 are shown. FIG. 4, a top view of the driven staple as shown in FIG. 3, shows the spread of the legs from the plane containing the axes of the legs of the undriven staple.

In a preferred embodiment of my invention, bevels 13 and 15 will be at approximately the same angle with respect to the plane normal to the leg axes, and the planes which contain a leg axis and are normal to a bevel will be at approximately the same angle with the plane containing the axes of both legs. In this preferred embodiment of the staple of my invention shown in FIGS. 1 through 4, it is seen the point areas 14 and 16 of bevels 13 and 15 respectively are in opposite quadrants of their respective solid quadrant sets. In order to obtain the preferred cross-over paths as shown in FIG. 3, and spread as shown in FIG. 4, point areas 14 and 16 are on the opposite inside quadrants.

Staples of my invention may be produced in a wide variety of sizes, the greatest benefits resulting as the staple legs are lengthened and the thickness of the legs increases. My invention is especially suitable for producing staples having legs in the order of 2 to 3 inches long. The staples of my invention may be produced from any gauge of stock and of any desired shape suitable for production of staples. It is preferred to use steel stock of a cross-section uniformly slightly out of round and providing parallel faces and intervening opposite rounded faces.

The single-bevel divergent-point staple of my invention has been found to follow a pre-determined desired path upon being driven. This ability to follow a pre-determined desired path is especially important when driving large staples into relatively narrow slats. Further, the single-bevel divergent-point staple of my invention has been found to minimize the tendency encountered with prior staples of following the coarse grain of hard wood, frequently causing deflection of the legs of the former staples through the outside surfaces of material into which the staple is driven. The points of the single-bevel staples have been found to be much more effective than the prior double-bevel staples, especially when the staples are driven into hard materials which frequently cause the legs of the double bevel staples to turn back on themselves.

The single-bevel staple of this invention may be mass produced with great uniformity which was not found in the prior double-bevel staples. Cutter wear results in minimal alteration of the desired bevel in the single-bevel staple as contrasted to major deviations from the desired bevels of double-cout staples. Further, the single-bevel staple of this invention may be readily produced with less complicated machinery in which the angle of the bevel may be readily changed to provide varying driving qualities as demanded for various applications.

Figure 5:
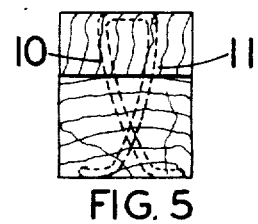
FIG. 5 is a cross-section parallel to the plane of the staple showing a staple as shown in FIG. 1 driven into wood backed by a metal plate to clinch the points.

Staples according to my invention may be clinched either internally or externally, depending upon the angles and orientation of the bevels. The staples of this invention are especially advantageous for internal clinching as illustrated in FIG. 5, because the staples more accurately follow paths which allow the legs to form the smallest angles with the clinching surface for given displacements from the axes of the undriven legs, thereby maximizing the likelihood of proper clinching.

Larger staples, as are most frequently utilized in my invention, are difficult to maintain in serial contiguous relation in the form of "sticks" as are used in fastener-driving machines. The same problem arises in the cohesion of nails, screws and other fasteners which are desired to be maintained in sticks for use in driving machines. Current methods of forming staple sticks are to apply coatings to the stock prior to formation of the staple and cohering the staples in contiguous relation by heating. However, pre-coating the fastener stock has significant drawbacks in that the cut points present bare metal which is susceptible to corrosion.

Figure 6:
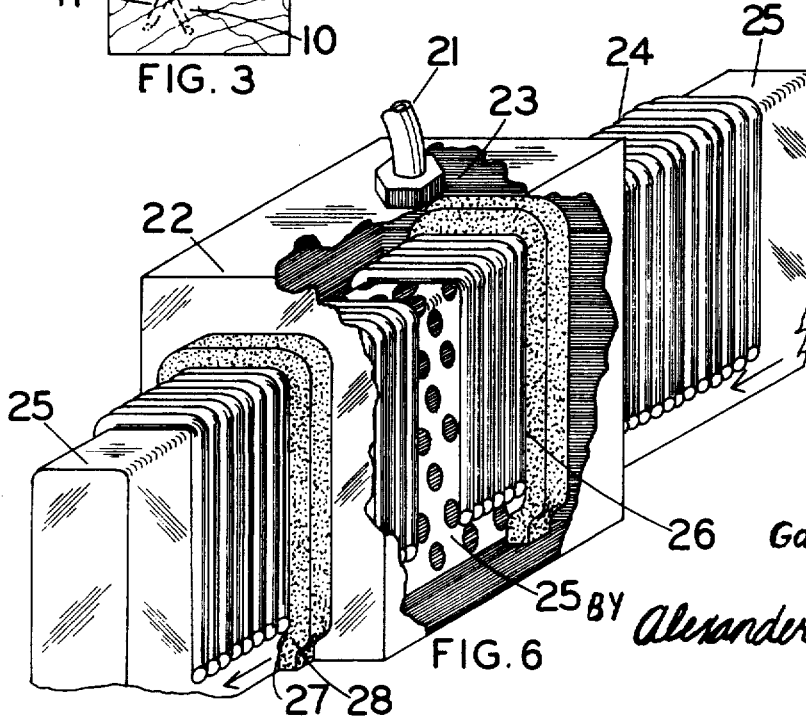
FIG. 6 shows the method of application of the adhesive-coating of this invention to form staple sticks.

Referring specifically to FIG. 6, a cutaway view of an apparatus for the new adhesive application method is shown. Tube 21 supplies reservoir 22 with liquid adhesive 23. The fasteners 24, already formed and pointed, proceed along rail 25, entering the reservoir at 26, passing through the reservoir, and exiting at 27. While in the reservoir the staples pass directly through the liquid adhesive, thereby accomplishing the complete coating of the fasteners. The coating of the insides of the fasteners may be facilitated by means of holes in the rail inside the reservoir which allow the liquid adhesive easier access to the inside fastener surfaces. As the fasteners emerge from the reservoir at 27, the excess adhesive is removed by wiper 28 and the drying process begins. The coated fasteners or staples 24a emerging on bar 25 from wiper 28 are dried in stick form and are ready for use in guns or other power fasteners.

Figure 7:
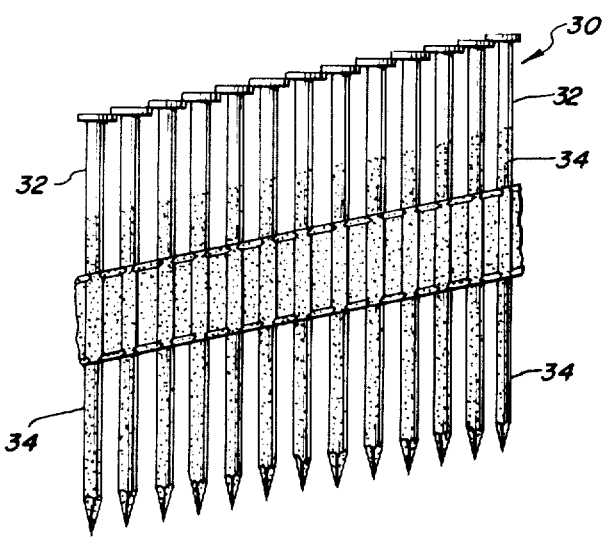
FIG. 7 is a perspective view of a series of nails in stick form coated with the compositions of this invention.

Referring to FIG. 7, a perspective of a "stick" 30 of a group of nails 32 which are unified by a holding strip 34 of plastic or paper material. A coating 34 of the type described herein is shown applied to the surface of the nail shank and point.

Figure 8:
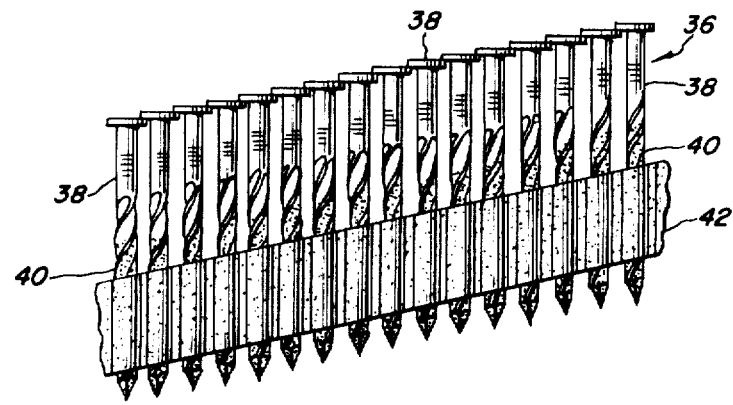
FIG. 8 is a perspective view of a group of screw shank nails also in stick form and coated as in FIG. 7.
Figure 9:
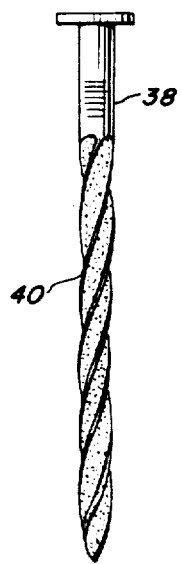
FIG. 9 is a perspective of a screw shank nail coated with the compositions of this invention.

FIG. 8 illustrates a "stick" 36 of screw shank nails 38 having a coating 40 applied to the shank and point of each nail 38. The nails are held together in stick form for use in automatic driving machines by a strip of relatively rigid material 42. FIG. 9 illustrates a single coated screw shank nail 38 having coating 40 applied to the shank and separated from the strip 36 illustrated in FIG. 8.

Figure 10:
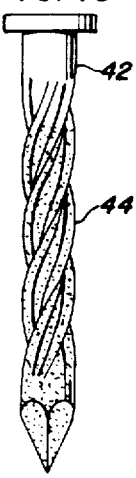
FIG. 10 is a perspective of a single stud nail coated with the composition of this invention.

FIG. 10 is a single stud nail 42 having a similar adhesive coating 44 applied to the spiral shank.

Figure 11:
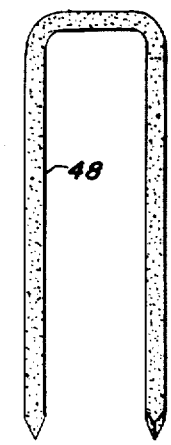
FIG. 11 is a perspective of a double beveled chisel point staple coated with the coating composition of the invention.
Figure 12:
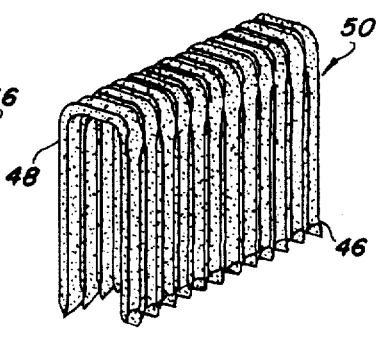
FIG. 12 is a perspective view of a plurality of the staples of FIG. 11 joined together in stick form with the adhesive coating composition off this invention.

FIG. 11 is a single double bevel, chisel point staple 46 having a coating 48 applied to the surface thereof and FIG. 12 illustrates a plurality of the coated staples 46 of FIG. 11 held together in a stick 40 with the adhesive coating composition of the present invention.

The following examples are presented to illustrate the present invention.

EXAMPLE I

Pull tests were performed using three types of divergent-point staples: (1) commercially available uncoated staples having opposite double-bevel points, terminating in a knife edge at about 22° to a plane normal to the axis of the leg, providing a sharp penetrating point at the extreme tip of the leg, 16 gauge flattened stock, 1½ inch leg length and seven-sixteenths inch crown; (2) uncoated single-bevel staples according to this invention, each single-bevel being at about 22° to a plane normal to the axis of its leg, 16 gauge flattened stock, 1½ inch leg length and seven-sixteenths inch crown; (3) single-bevel staple, the same as used in number 2 except coated with the following composition: 30 weight percent solids in a solvent which is 25 weight percent toluene and 25 weight percent alcohol and 50 weight percent methylethyl ketone, the solids portion being 65 weight percent nitro-cellulose, 30 weight percent methyl methacrylate and 5 weight percent triphenyl phosphate. The test was performed by driving the staples with the same machine through three-fourths inch plywood into one-inch wood strips. Six of each type of staple were driven and the force necessary in pounds to remove the staples was measured. Results are shown in the following table:

TABLE I

POUNDS NECESSARY TO EXTRACT STAPLES

| Uncoated Double-Bevel Divergent-Point | Uncoated Single-Bevel Divergent-Point | Coated Single-Bevel Divergent-Point |
|---|---|---|
| 212 | 238 | 328 |
| 190 | 222 | 334 |
| 164 | 256 | 300 |
| 180 | 216 | 340 |
| 132 | 208 | 301 |
| 156 | 262 | 330 |
| Average 172 | 237 | 322 |

It is readily seen that the single-bevel divergent-point staple of this invention has substantially greater holding power than the presently used double-bevel divergent-point staple. It is further seen that the adhesive-coated single-bevel divergent-point staple of this invention has substantially increased holding power over the same single-bevel uncoated staple, almost doubling the holding power when compared to the presently used double-bevel divergent-point staple.

EXAMPLE II

Pull tests were performed using two types of nails: (1) common 10d round-head nail, 3 inches long, without any coating; (2) 10d round-head nail as in number 1 except coated with the same coating used in Example I. The test was performed by driving the nails through one-inch plywood into 2 × 4 construction fir using a pneumatic nail driver at 95 pounds per square inch. 10 of each type of nail were driven and the force necessary in pounds to remove the nails was measured. Results are shown in the following table:

TABLE II

POUNDS NECESSARY TO EXTRACT NAILS

| Uncoated | Coated |
|---|---|
| 388 | 430 |
| 320 | 520 |
| 398 | 436 |
| 354 | 540 |
| 408 | 582 |
| 403 | 510 |
| 396 | 554 |
| 354 | 588 |
| 320 | 446 |
| 300 | 460 |
| Average 364.1 | 506.6 |

It is seen that the coated nail has an average of over 40 percent greater holding power than the same uncoated nail. The advantages of the coating of my invention are therefore threefold: improved fastener stick cohesion; improved fastener protection; and improved holding power.

The following examples illustrate additional adhesive coatings which may be employed to coat and/or unite a plurality of fasteners together as described in the preceding Examples I and II.

COATING-ADHESIVE COMPOSITIONS

EXAMPLE III

| COMPONENTS | |
|---|---|
| Nitrocellulose | 60 Parts |
| Ethyl Acrylate | 35 Parts |
| Dioctyl Phthalate | 5 Parts |
| Total | 100 Parts |

Dilute to 30% solids in solvent of 35% toluene, 20% methanol, 45% methylethyl ketone.

EXAMPLE IV

| COMPONENTS | |
|---|---|
| Nitrocellulose | 65 Parts |
| Butyl Acrylate | 25 Parts |
| Polyester of ethylene glycol and sebacic acid | 6 Parts |
| Nylon (VGH DuPont) | 4 Parts |
| Total | 100 Parts |

(Solvent same as Example I)

EXAMPLE V

| COMPONENTS | |
|---|---|
| Nitrocellulose | 74 Parts |
| Ethylmethacrylate | 20 Parts |
| Expoxizized soybean oil | 3 Parts |
| Nylon (VHC) | 3 Parts |
| Total | 100 Parts |

(Solvent same as Example III)

EXAMPLE VI

| COMPONENTS | |
|---|---|
| Nitrocellulose | 65 Parts |
| Butylmethacrylate | 25 Parts |
| Butyl phthalate | 5 Parts |
| Nylon (VGH) | 5 Parts |
| Total | 100 Parts |

Solvent: 40% solids in 40% toluene, 20% alcohol, 40% methyl ethyl ketone.

The above coating-adhesive compositions provide good protection against corrosion and provide excellent holding power for the fastener when applied into the work. The nylon employed is a soluble coating grade material. While the plasticizer may be present in amounts of from 2 to 6 percent, it is preferred to employ the same in amounts of from 3 to 5 percent by weight.

I claim:

1. A staple having a body comprising a crown and first and second legs approximately parallel in U-form relation, each of said legs terminating in a single bevel extending substantially across the full section of the respective leg and forming a point area at the bevel edge furthest from the crown, each of said bevels forming an angle of from about 20° to about 70° with a plane normal to the axis of said leg, and each of said bevels being normal to a plane which contains the axis of the respective leg and is from about 20° to about 70° with a plane containing the axes of both of said legs, and having a coating of an adhesive composition comprising from about 20 to 40 weight percent solids in an organic solvent, the solids portion comprising from about 55 to 75 weight percent nitro-cellulose, from about 20 to 40 weight percent of a thermoplastic acrylic polymer and from about 3 to 5 weight percent of a low-temperature plasticizer.

2. The staple of claim 1 wherein said planes containing the axes of the respective legs from angles of from 40° to about 50° with a plane containing the axes of both of said legs.

3. The staple of claim 1 wherein the low-temperature plasticizer is triphenyl phosphate.

4. The staple of claim 1 wherein the thermoplastic acrylic polymer is selected from the acrylic and methacrylic esters.

5. The staple of claim 1 wherein the low-temperature plasticizer is triphenyl phosphate.

6. A coated metallic fastener having improved bonding and holding power to materials into which it is driven and improved resistance to corrosion while in application use comprising a metal fastener of the type to be driven by a fastener driving machine, said fastener having at least one shank portion to be driven into the work, said shank portion being provided with a coating thereon of a composition comprising from about 55 to 75 weight percent nitrocellulose, from about 20 to 40 weight percent of a thermoplastic acrylic ester polymer, from about 2 to 6 weight percent of a low temperature plasticizer and from zero to about 5 weight percent nylon.

7. The coated fastener of claim 6 wherein the low-temperature plasticizer is present in an amount of from 3 to 5 weight percent.

8. The coated fastener of claim 6 wherein the fastener is a nail.

9. The coated nail of claim 8 wherein the nail has a smooth shank.

10. The coated nail of claim 8 wherein the nail has a deformed shank.

11. The coated fastener of claim 6 wherein the fastener is a staple.

12. The coated fastener of claim 6 wherein the fastener is a stud.

* * * * *

UNITED STATES PATENT OFFICE
CERTIFICATE OF CORRECTION

Patent No. 3,813,985　　　　　　　　Dated　June 4, 1974

Inventor(s)　GARRY R. PERKINS

It is certified that error appears in the above-identified patent and that said Letters Patent are hereby corrected as shown below:

On the title page, the home address of Mr. Perkins should be Cary, Illinois.

Column 2, line 22, "to" (second occurrence) should be deleted.

Column 2, line 37, "thick" should be --stick--

Column 4, line 19, "off" should be --of--

Column 5, line 40, "double-cout" should be --double-cut--

Column 6, line 37, "stick 40" should be --stick 50--

Column 8, line 63, "from" (first occurrence) should be --form--.

Signed and sealed this 8th day of October 1974.

(SEAL)
Attest:

McCOY M. GIBSON JR.　　　　　　　　C. MARSHALL DANN
Attesting Officer　　　　　　　　　Commissioner of Patents